(12) United States Patent
Pan

(10) Patent No.: US 12,413,395 B2
(45) Date of Patent: Sep. 9, 2025

(54) VEHICLE CERTIFICATE APPLICATION METHOD, VEHICLE-MOUNTED DEVICE, AND ROADSIDE UNIT

(71) Applicant: Shenzhen Yinwang Intelligent Technologies Co., Ltd., Shenzhen (CN)

(72) Inventor: Kai Pan, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 18/156,845

(22) Filed: Jan. 19, 2023

(65) Prior Publication Data
US 2023/0155813 A1     May 18, 2023

Related U.S. Application Data

(63) Continuation of application No. PCT/CN2020/104556, filed on Jul. 24, 2020.

(51) Int. Cl.
    *H04L 29/06*        (2006.01)
    *H04L 9/08*         (2006.01)
    (Continued)

(52) U.S. Cl.
    CPC ............. *H04L 9/0825* (2013.01); *H04W 4/44* (2018.02); *H04W 12/069* (2021.01)

(58) Field of Classification Search
CPC ... H04L 9/0825; H04L 9/321; H04L 2209/84; H04L 9/3268; H04L 63/0823; H04L 63/18; H04W 4/44; H04W 12/069; H04W 12/03
See application file for complete search history.

(56) References Cited

U.S. PATENT DOCUMENTS

| | | | | |
|---|---|---|---|---|
| 6,087,963 A | * | 7/2000 | Kobayashi | ........... G07B 15/063 340/928 |
| 8,819,418 B2 | * | 8/2014 | Ando | ..................... G08G 1/123 713/158 |

(Continued)

FOREIGN PATENT DOCUMENTS

| | | |
|---|---|---|
| CN | 103973760 A | 8/2014 |
| CN | 105812131 A | 7/2016 |
| CN | 110418309 A | 11/2019 |

OTHER PUBLICATIONS

Yipin Sun et al., "Roadside Units Deployment for Efficient Short-Time Certificate Updating in VANETs", Communications (ICC), 2010 IEEE Internat Onal Conference on IEEE, Piscataway, NJ, USA, May 23, 2010, XP031703081, 5 pages.

*Primary Examiner* — Mahfuzur Rahman
(74) *Attorney, Agent, or Firm* — Conley Rose, P.C.

(57) ABSTRACT

A vehicle certificate application method implemented by a vehicle-mounted device includes sending a certificate proxy application message to a roadside unit RSU in response to determining that the Uu interface of the vehicle-mounted device is unavailable or the signal quality of the Uu interface is lower than the threshold. The certificate proxy application message includes certificate application information of a vehicle to which the vehicle-mounted device is mounted. The certificate application information is forwarded by the RSU to a third-party authority. The vehicle-mounted device receives, from the RSU, a certificate proxy application response that includes an identity certificate of the vehicle generated by the third-party authority based on the certificate application information.

20 Claims, 7 Drawing Sheets

(51) Int. Cl.
*H04W 4/44* (2018.01)
*H04W 12/069* (2021.01)

(56) References Cited

U.S. PATENT DOCUMENTS

| | | | |
|---|---|---|---|
| 9,601,016 B2* | 3/2017 | Ando | G08G 1/123 |
| 2013/0067220 A1* | 3/2013 | Ando | H04W 4/44 |
| | | | 713/156 |
| 2015/0358170 A1* | 12/2015 | Ando | H04L 67/12 |
| | | | 713/156 |
| 2019/0215729 A1* | 7/2019 | Oyman | H04L 65/1016 |
| 2019/0297526 A1* | 9/2019 | Das | H04W 28/0284 |
| 2019/0316919 A1* | 10/2019 | Keshavamurthy | ........................ |
| | | | G08G 1/096844 |
| 2020/0092685 A1* | 3/2020 | Fehrenbach | H04W 36/08 |
| 2021/0014661 A1* | 1/2021 | Jeong | H04W 4/40 |
| 2022/0039082 A1* | 2/2022 | Belleschi | H04W 72/51 |
| 2022/0319312 A1* | 10/2022 | Mintz | G06Q 30/0224 |

* cited by examiner

VEHICLE CERTIFICATE APPLICATION METHOD, VEHICLE-MOUNTED DEVICE, AND ROADSIDE UNIT

CROSS-REFERENCE TO RELATED APPLICATIONS

This application is a continuation application of International Patent Application No. PCT/CN2020/104556, filed on Jul. 24, 2020, the disclosure of which is hereby incorporated by reference in its entirety.

TECHNICAL FIELD

The present disclosure relates to the field of internet of vehicles technologies, and in particular, to a vehicle certificate application method, a vehicle-mounted device, and a roadside unit.

BACKGROUND

Long-Term Evolution vehicle-to-everything (LTE-V2X) includes vehicle to network (V2N) communication, vehicle-to-vehicle (V2V) communication, vehicle-to-infrastructure (V2I) connection, vehicle-to-pedestrian (V2P) communication.

When a vehicle communicates with another device, a sent message may be signed by using a short-term identity certificate, so that a receive device can determine whether the message is valid. The short-term identity certificate may be a pseudonym certificate or a real-name certificate. The pseudonym certificate is a pseudonym used by the vehicle in communication, and may be continuously changed to protect user privacy.

Usually, the vehicle may have at most one real-name certificate. The real-name certificate may be used to prove a real identity of the vehicle to a roadside unit (RSU) or a service provider (SP) to obtain a specific internet of vehicles application service provided by the service provider.

Usually, the real-name certificate of the vehicle does not exist in the vehicle for a long time. When the vehicle requires a real-name certificate, the vehicle needs to apply for the real-name certificate from a certificate authority (CA). Currently, the vehicle interacts with the certificate authority through a universal mobile telecommunications system (UMTS) air (Uu) interface to apply for the real-name certificate. The Uu interface is an interface used for communication between user equipment (UE) and a UMTS terrestrial radio access network. In some cases, the Uu interface may be in an unavailable state. For example, the Uu interface of the vehicle fails, or the vehicle is at a location with poor signal quality, for example, in a tunnel or a basement. Therefore, a solution for applying for the real-name certificate when the Uu interface is unavailable is urgently required.

SUMMARY

Embodiments of the present disclosure provide a vehicle certificate application method, a vehicle-mounted device, and a roadside unit, so that a vehicle-mounted device may apply for an identity certificate through a proximity communication five (PC5) interface when a Uu interface is unavailable or signal quality of the Uu interface is poor.

According to a first aspect, an embodiment of the present disclosure provides a vehicle certificate application method including: when a Uu interface of a vehicle-mounted device is unavailable or signal quality of the Uu interface is lower than a threshold, the vehicle-mounted device sends a certificate proxy application message to a roadside unit RSU, where the certificate proxy application message includes certificate application information of a vehicle to which the vehicle-mounted device belongs, and the certificate application information is forwarded by the RSU to a third-party authority; and the vehicle-mounted device receives a certificate proxy application response from the RSU, where the certificate proxy application response includes an identity certificate of the vehicle, and the identity certificate is generated by the third-party authority based on the certificate application information and sent to the RSU. In an example, the third-party authority may be a certificate authority.

That is, when the vehicle-mounted device cannot send the certificate application information through the Uu interface, the vehicle-mounted device may send the certificate application information by using the roadside unit to obtain a required certificate through application.

In a possible implementation, the certificate application information includes identity information of the vehicle and a public key of the vehicle, and the identity certificate of the vehicle is generated by the third-party authority based on the identity information and the public key of the vehicle. Before the vehicle-mounted device sends the certificate proxy application message to the roadside unit RSU, the method further includes: the vehicle-mounted device determines that the vehicle enters a first usage scenario, where a service in the first usage scenario needs to be obtained by the vehicle based on the identity certificate.

That is, in this implementation, when a specific identity certificate of the vehicle is required for obtaining a corresponding service, if a certificate application information cannot be sent through the Uu interface, the identity certificate may be obtained by using the roadside unit.

In a possible implementation, that the vehicle-mounted device determines that the vehicle enters a first usage scenario includes: the vehicle-mounted device determines, based on a user input, that the vehicle enters the first usage scenario; or the vehicle-mounted device determines, based on an operating status of a first device on the vehicle, that the vehicle enters the first usage scenario. For example, the vehicle may be a police car, and the first device may be an alarm or an alarm light; or the vehicle may be an ambulance, and the first device may be any one or more of a ventilator, a blood oxygen monitor, an alarm, and an alarm light.

That is, in this implementation, the vehicle-mounted device can flexibly determine whether the vehicle enters a corresponding usage scenario.

In a possible implementation, the certificate proxy application message further includes a registration certificate of the vehicle, the certificate application information is signed by using the registration certificate, and the registration certificate is forwarded by the RSU to the third-party authority, and is used by the third-party authority to verify the certificate application information.

That is, in this implementation, the third-party authority may obtain the registration certificate of the vehicle, to verify, by using the registration certificate of the vehicle, whether the certificate application information is valid.

In a possible implementation, the certificate proxy application message further includes a message type indicator, and the message type indicator is used to indicate that a message carrying the message type indicator is a certificate proxy application message.

That is, in this implementation, the message type indicator may be carried in a message to indicate that the message is a certificate proxy application message, so that the roadside unit performs corresponding processing.

In a possible implementation, before the vehicle-mounted device sends the certificate proxy application message to the roadside unit RSU, the method further includes: the vehicle-mounted device sends a connection setup request to the RSU, where the connection setup request includes first check information, and the first check information is encrypted by using a public key of the RSU. That the vehicle-mounted device sends a certificate proxy application message to a roadside unit RSU includes: when the vehicle-mounted device receives a connection setup response from the RSU and the connection setup response includes a second check information, sending the certificate proxy application message to the RSU, where the second check information is generated based on the first check information.

That is, in this implementation, a check information is set, so that a receive device can verify that information received by the receive device is truly sent by a related device, thereby improving security of information exchange.

In a possible implementation, the certificate application information in the certificate proxy application message is encrypted by using a public key of the third-party authority; and/or the identity certificate in the certificate proxy application response is encrypted by using the public key of the vehicle.

That is, in this implementation, the roadside unit can be prevented from excessively obtaining messages exchanged between the vehicle-mounted device and the third-party authority, thereby improving communication security.

In a possible implementation, the certificate proxy application message is a basic safety message BSM, and/or the certificate proxy application response is a BSM or a road safety message (RSM).

According to a second aspect, an embodiment of the present disclosure provides a vehicle certificate application method, including: a roadside unit RSU receives a certificate proxy application message from a vehicle-mounted device, where the certificate proxy application message includes certificate application information of a vehicle in which the vehicle-mounted device is located, and the certificate proxy application message is sent by the vehicle-mounted device when a Uu interface of the vehicle-mounted device is unavailable or signal quality of the Uu interface is lower than a threshold; the RSU sends a certificate application information to a third-party authority, where the certificate application information is used by the third-party authority to generate an identity certificate; the RSU receives the identity certificate from the third-party authority; and the RSU sends a certificate proxy application response to the vehicle-mounted device, where the certificate proxy application response includes the identity certificate.

In a possible implementation, the certificate proxy application message further includes a registration certificate of the vehicle, and the certificate application information is signed by using the registration certificate. The method further includes: the RSU sends the registration certificate to the third-party authority, where the registration certificate is used by the third-party authority to verify the certificate application information.

In a possible implementation, the certificate proxy application message further includes a message type indicator, and the message type indicator is used to indicate that a message carrying the message type indicator is a certificate proxy application message.

In a possible implementation, before the RSU receives the certificate proxy application message from the vehicle-mounted device, the method further includes: the RSU receives a connection setup request from the vehicle-mounted device, where the connection setup request includes first check information, and the first check information is encrypted by using a public key of the RSU; and the RSU sends a connection setup response to the vehicle-mounted device in response to the connection setup request, where the connection setup response is used to indicate the vehicle-mounted device to send the certificate proxy application message to the RSU, the connection setup response includes a second check information, and the second check information is generated based on the first check information.

In a possible implementation, the certificate application information in the certificate proxy application message is encrypted by using a public key of the third-party authority; and/or the identity certificate in the certificate proxy application response is encrypted by using a public key of the vehicle.

In a possible implementation, the certificate application information includes the public key of the vehicle and identity information of the vehicle, the identity certificate is obtained by the third-party authority by encrypting the public key of the vehicle and the identity information of the vehicle by using a first private key, and the first private key is a private key of the third-party authority.

According to a third aspect, an embodiment of the present disclosure provides a vehicle certificate application apparatus, configured in a vehicle-mounted device. The apparatus includes a sending unit and a receiving unit. The sending unit is configured to: when a Uu interface of the vehicle-mounted device is unavailable or signal quality of the Uu interface is lower than a threshold, send a certificate proxy application message to a roadside unit RSU, where the certificate proxy application message includes certificate application information of a vehicle to which the vehicle-mounted device belongs, and the certificate application information is forwarded by the RSU to a third-party authority. The receiving unit is configured to receive a certificate proxy application response from the RSU, where the certificate proxy application response includes an identity certificate of the vehicle, and the identity certificate is generated by the third-party authority based on the certificate application information and sent to the RSU. In an example, the third-party authority may be a certificate authority.

According to a fourth aspect, an embodiment of the present disclosure provides a vehicle certificate application apparatus, configured in a roadside unit RSU. The apparatus includes a receiving unit and a sending unit. The receiving unit is configured to receive a certificate proxy application message from a vehicle-mounted device, where the certificate proxy application message includes certificate application information of a vehicle in which the vehicle-mounted device is located, and the certificate proxy application message is sent by the vehicle-mounted device when a Uu interface of the vehicle-mounted device is unavailable or signal quality of the Uu interface is lower than a threshold. The sending unit is configured to send a certificate application information to a third-party authority, where the certificate application information is used by the third-party authority to generate an identity certificate. The receiving unit is further configured to receive the identity certificate from the third-party authority. The sending unit is further configured to send a certificate proxy application response to the vehicle-mounted device, where the certificate proxy application response includes the identity certificate.

According to a fifth aspect, an embodiment of the present disclosure provides a vehicle-mounted device, including a processor, a memory, and a transceiver. The memory is configured to store computer instructions. When the vehicle-mounted device runs, the processor executes the computer instructions, so that the vehicle-mounted device performs the method provided in the first aspect.

According to a sixth aspect, an embodiment of the present disclosure provides a roadside unit, including a processor, a memory, and a transceiver. The memory is configured to store computer instructions. When the roadside unit runs, the processor executes the computer instructions, so that the roadside unit performs the method provided in the second aspect.

According to a seventh aspect, an embodiment of the present disclosure provides a computer storage medium. The computer storage medium includes computer instructions. When the computer instructions are run on an electronic device, the electronic device is enabled to perform the method provided in the first aspect or the method provided in the second aspect.

According to an eighth aspect, an embodiment of the present disclosure provides a computer program product. When program code included in the computer program product is executed by a processor in an electronic device, the method provided in the first aspect or the method provided in the second aspect is implemented.

In the vehicle certificate application method provided in embodiments of the present disclosure, when a Uu interface of a vehicle-mounted device is unavailable or signal quality of the Uu interface is poor, an identity certificate may be applied for through a PC5 interface, so that a required certificate can be obtained through application when a vehicle is in an environment in which signal quality of a Uu interface is poor, for example, in a tunnel or an underground garage.

DESCRIPTION OF EMBODIMENTS

The following describes technical solutions of embodiments in the present disclosure with reference to accompanying drawings. It is clear that the described embodiments are merely some but not all of embodiments of the present disclosure.

"An embodiment", "some embodiments", or the like in descriptions of this specification means that one or more embodiments of the present disclosure include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner.

In the descriptions of this specification, "/" means "or" unless otherwise specified. For example, AB may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in embodiments of the present disclosure, "a plurality of" means two or more.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more such features. The terms "include", "have", and their variants all mean "include but are not limited to", unless otherwise specifically emphasized in another manner.

Figure 1:
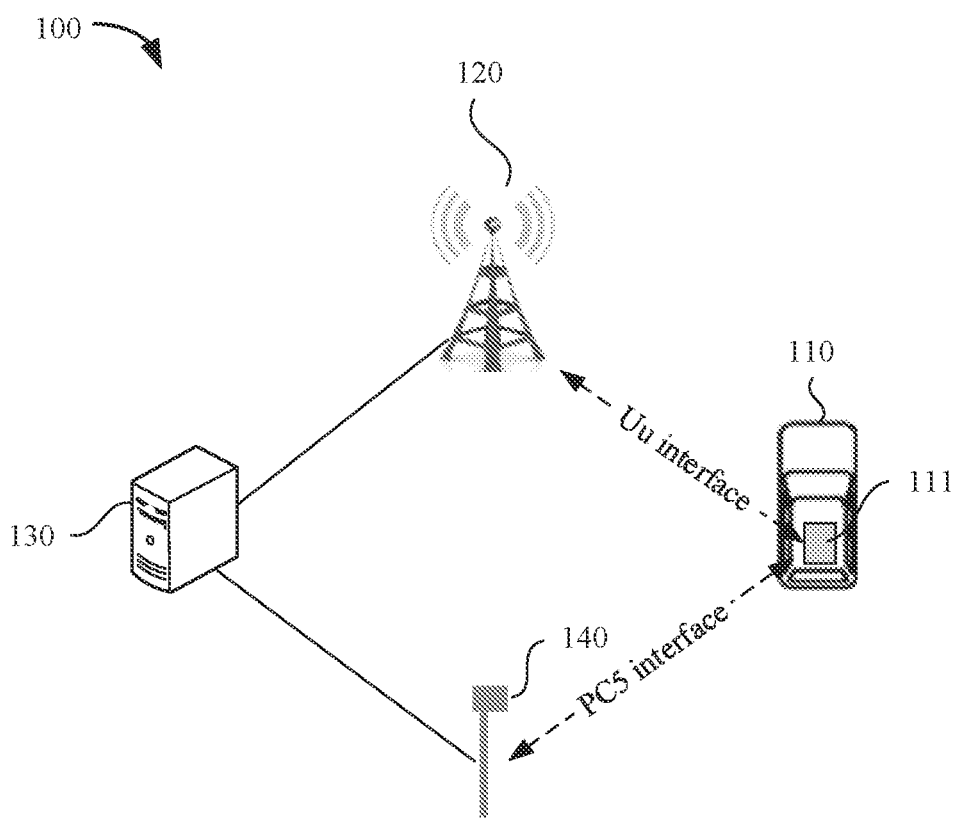
FIG. 1 is a schematic diagram of a network system according to an embodiment of the present disclosure.

Embodiments of the present disclosure provide a vehicle certificate application method, and the method may be applied to a network system 100 shown in FIG. 1. The network system 100 may include a vehicle 110, a base station 120, a certificate authority 130, and a roadside unit 140.

The vehicle 110 may be an automobile or a motor vehicle in another form. For example, the vehicle may be a police car, an ambulance, a bus, a truck, an agricultural vehicle, a parade float, a ride in an amusement park, or a vehicle in another form.

The vehicle may be equipped with a vehicle-mounted device 111. The vehicle-mounted device 111 may be a device that is disposed in the vehicle 110 and that has data processing and data sending functions, for example, an on-board unit (OBU) or a telematics box (T-BOX).

Figure 2:
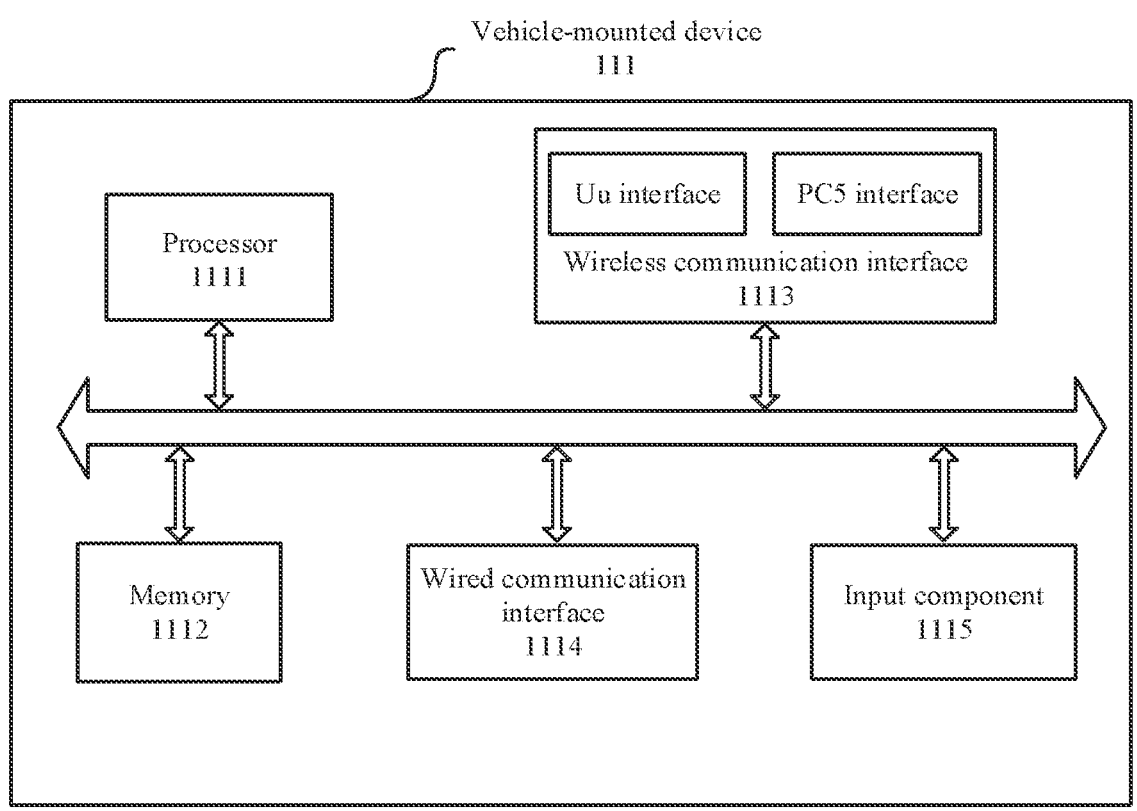
FIG. 2 is a schematic diagram of a structure of a vehicle-mounted device according to an embodiment of the present disclosure.

FIG. 2 shows a possible structure of the vehicle-mounted device 111. As shown in FIG. 2, the vehicle-mounted device 111 may include components such as a processor 1111, a memory 1112, a wireless communication interface 1113, a wired communication interface 1114, and an input component 1115.

The memory 1112 may be configured to store a software program, instructions, and related information. For example, the memory 1112 may be configured to store a program for implementing, on the vehicle-mounted device side, the vehicle certificate application method provided in embodiments of the present disclosure.

The processor 1111 may invoke the software program and the instructions stored in the memory 1112, to control the vehicle-mounted device 111 to implement a related function. For example, the processor 1111 may invoke the program, stored in the memory 1112, for implementing, on the vehicle-mounted device side, the vehicle certificate application method provided in embodiments of the present disclosure, to control the vehicle-mounted device 111 to perform implementation steps of the method on the vehicle-mounted device.

The wireless communication interface 1113 may include a Uu interface and a PC5 interface. The Uu interface is used for communication between the vehicle-mounted device 111 and the base station 120, and the PC5 interface is used for communication between the vehicle-mounted device 111 and the roadside unit 140.

The wired communication interface 1114 may be used for communication between the vehicle-mounted device 111 and another device (for example, an alarm or an alarm light) in the vehicle 110.

The input component 1115 may receive input initiated by a user. In an example, the input component 1115 may be a touchscreen, and may receive a touch operation initiated by a user. In an example, the input component 1115 may be a microphone, and may receive voice input of a user.

The base station 120 may communicate with the vehicle-mounted device 111 through the Uu interface, and communicate with the certificate authority 130 by using a wired network. For example, the base station 120 may be an evolved NodeB (eNodeB), an access network device in a 5th generation (5G) mobile communication technology, an access network device in a 3rd generation (3G) mobile communication technology, or an access network device in a 2nd generation (2G) mobile communication technology.

The roadside unit 140 may also be referred to as a roadside station, and may communicate with the vehicle-mounted device 111 through the PC5 interface, and communicate with the certificate authority 130 by using a wired network. For example, the roadside unit 140 may include a high-gain directional beam control read/write antenna and a radio frequency controller. The high-gain directional beam control read/write antenna is a microwave transceiver module, and is responsible for signal and data transmission/reception, modulation/demodulation, encoding/decoding, and encryption/decryption. The radio frequency controller is a module for controlling data transmission and reception, and processing information transmission to a host computer and information reception from the host computer.

The certificate authority 130 may generate a digital certificate based on an application of a certificate applicant. For example, the certificate authority 130 may encrypt a public key and other information of the certificate applicant by using a private key of the certificate authority 130, to obtain a digital certificate that the certificate applicant applies for.

Then, with reference to the network system shown in FIG. 1, the vehicle certificate application method provided in embodiments of the present disclosure is described by using an example.

In general, in the vehicle certificate application method provided in embodiments of the present disclosure, the vehicle-mounted device 111 in the vehicle 110 may determine that the vehicle 110 enters a usage scenario A1, where the vehicle 110 can obtain a related service in the usage scenario A1 only based on an identity B1. Therefore, the vehicle-mounted device 111 needs to apply for an identity certificate B11 of the identity B1. Usually, if the Uu interface between the vehicle-mounted device 111 and the base station 120 is available or signal quality is good (for example, higher than a threshold C1), the vehicle-mounted device 111 may exchange information with the certificate authority 130 through the Uu interface, to apply for the identity certificate B11. If the Uu interface of the vehicle device 111 fails (the Uu interface is unavailable) or signal quality of the Uu interface is poor (for example, lower than the threshold C1), the vehicle-mounted device 111 may send a certificate proxy application message to the roadside unit 140, to request the roadside unit 140, in place of the vehicle-mounted device 111, to apply for the identity certificate B11 from the certificate authority 130.

Then, the vehicle certificate application method provided in embodiments of the present disclosure is described by using an example.

Figure 3A:
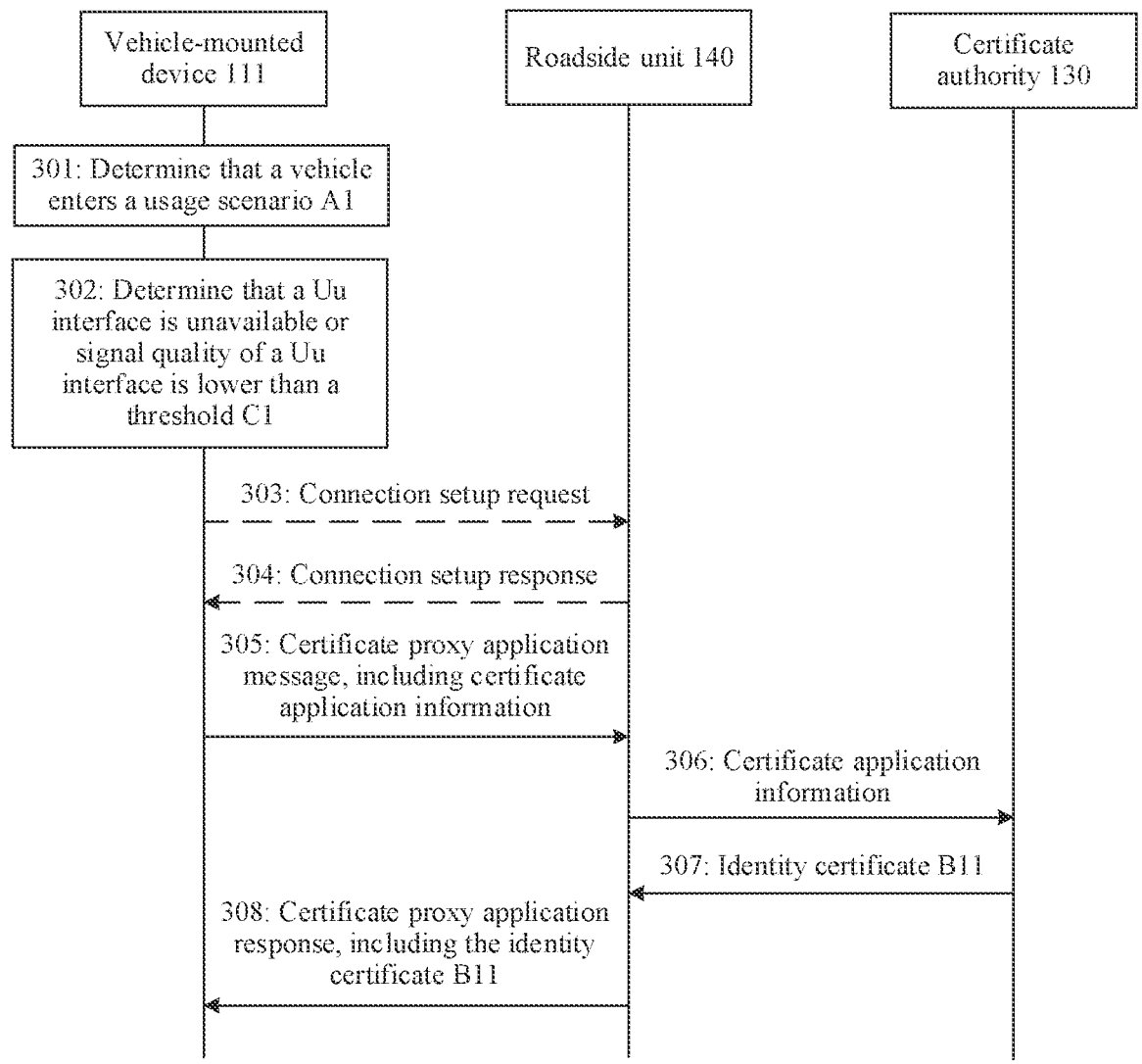
FIG. 3A is a flowchart of a vehicle certificate application method according to an embodiment of the present disclosure.

With reference to FIG. 3A, the vehicle-mounted device 111 may perform step 301 to determine that the vehicle 110 enters the usage scenario A1.

The usage scenario A1 may be understood as a scenario in which the vehicle 110 is performing a special task. For example, the vehicle 110 may be a police car, and the usage scenario A1 is a scenario in which the police car performs a call-out task. For another example, the vehicle 110 may be an ambulance, and the usage scenario A1 may be a scenario in which the ambulance performs a call-out task.

It can be understood that, when the vehicle 110 does not perform the special task, the vehicle 110 may be a common vehicle on a road, that is, the vehicle 110 is in a common scenario. For example, a police car that does not perform a call-out task may travel on a road as a common vehicle. When the vehicle 110 performs the special task, the vehicle 110 may enter the usage scenario A1.

In some embodiments, a driver (user) may perform scenario setting input to notify the vehicle-mounted device 111 that the vehicle 110 enters the usage scenario A1. That is, the vehicle-mounted device 111 may receive the scenario setting input of the user, and determine accordingly that the vehicle 110 enters the usage scenario A1. As described above, the vehicle-mounted device 111 may include the input component 1115, and the input component 1115 may receive the scenario setting input of the user, and determine accordingly that the vehicle 110 enters the usage scenario A1. For example, the input component 1115 may be a touchscreen, and the scenario setting input may be touch input generated on the touchscreen. For another example, the input component 1115 may be a microphone, and the scenario setting input may be language input.

In some embodiments, the vehicle-mounted device 111 may determine, based on an operating status of another device in the vehicle 110, that the vehicle 110 enters the usage scenario A1. It can be understood that starting, by a device that is in the vehicle 110 and that is related to the usage scenario A1, to operate may indicate that the vehicle 110 enters the usage scenario A1. For example, the vehicle 110 may be a police car, and the usage scenario A1 is a scenario in which the police car performs a call-out task. The device that is in the vehicle 110 and that is related to the usage scenario A1 may include an alarm, an alarm light, or the like. When the alarm and the alarm light start to operate, the vehicle enters the usage scenario A1. For another example, the vehicle 110 may be an ambulance, and the usage scenario A1 is a scenario in which the ambulance performs a call-out task. The device that is in the vehicle 110 and that is related to the usage scenario A1 may include a ventilator, a blood oxygen monitor, an alarm, an alarm light, or the like. The vehicle-mounted device 111 may obtain the operating status of the device that is in the vehicle 110 and that is related to the usage scenario A1. For example, as described above, the vehicle-mounted device 111 may communicate with the another device in the vehicle 110 through the wired communication interface 1114, to obtain the operating status of the another device. For example, when the device that is in the vehicle 110 and that is related to the usage scenario A1 starts, a notification message may be sent to the vehicle-mounted device 111, to notify the vehicle-mounted device 111 that the device that is in the vehicle 110 and that is related to the usage scenario A1 starts to operate.

Therefore, the vehicle-mounted device 111 may determine that the vehicle 110 enters the usage scenario A1.

It can be understood that, when the vehicle 110 is in the usage scenario A1, for ease of performing a related task, the vehicle 110 should obtain one or more internet of vehicles application services, and the one or more internet of vehicles application services should not be obtained by a common vehicle (for example, a vehicle not in the usage scenario A1). For example, when a police car performs a call-out task, that is, when the police car is in a scenario of performing a call-out task, traffic lights should provide a traffic light controllable service for the police car. When the police car obtains the traffic light controllable service, the police car may control the traffic lights, so that the police car can conveniently perform the call-out task. In this embodiment of the present disclosure, a service that should be obtained by a vehicle in the usage scenario A1 and should not be obtained by a common vehicle may be referred to as a service in the usage scenario A1.

It can be understood that the vehicle 110 in the usage scenario A1 can obtain a service in the usage scenario A1 only based on the specific identity B1 (for example, a real identity). Therefore, when the vehicle 110 enters the usage scenario A1, the vehicle 110 needs to apply for the identity certificate B11 (for example, a real-name certificate) corresponding to the identity B1.

The vehicle-mounted device 111 may perform step 302 to determine that the Uu interface is unavailable or signal quality of the Uu interface is lower than the threshold C1.

In some embodiments, the vehicle-mounted device 111 may detect whether the Uu interface of the vehicle-mounted device 111 fails, and if the Uu interface fails, may determine that the Uu interface is unavailable.

In some embodiments, the vehicle-mounted device 111 may determine that the vehicle-mounted device 111 cannot connect to the base station 120 through the Uu interface, and then determine that the Uu interface is unavailable. For example, the vehicle-mounted device 111 may determine that an attempt of the vehicle-mounted device 111 to connect to the base station 120 fails, and then determine that the Uu interface is unavailable. For example, the vehicle-mounted device 111 may attempt to connect to the base station 120 by using a random access program. In the random access procedure, if the vehicle-mounted device 111 has not received a random access response (RAR) or a contention resolution result when a timer expires, the attempt to connect to the base station 120 fails, that is, the vehicle-mounted device 111 cannot connect to the base station 120 through the Uu interface.

In some embodiments, when the vehicle-mounted device 111 is connected to the base station 120, the vehicle-mounted device 111 may determine signal quality of the Uu interface of the vehicle-mounted device 111. In this embodiment of the present disclosure, signal quality of the Uu interface of the vehicle-mounted device 111 may be signal quality of a cellular cell in which the vehicle-mounted device 111 resides. The vehicle-mounted device 111 may measure, according to a related protocol of the 3rd generation partnership project (3GPP), the signal quality of the cell in which the vehicle-mounted device 111 resides. In an example, the signal quality of the cell may be represented by a reference signal received power (RSRP). In another example, the signal quality of the cell may be represented by reference signal received quality (RSRQ). In another example, the signal quality of the cell may be represented by a signal-to-interference-plus-noise ratio (SINR). In another example, the signal quality of the cell may be represented jointly by two or more of an RSRP, RSRQ, an SINR, and a received signal strength indicator (RSSI). Therefore, the signal quality of the cell in which the vehicle-mounted device 111 resides may be obtained, that is, the signal quality of the Uu interface of the vehicle-mounted device 111 may be obtained.

The vehicle-mounted device 111 may determine whether the signal quality of the Uu interface is lower than the threshold C1. If the signal quality of the Uu interface is lower than the threshold C1, the signal quality of the Uu interface is poor, and it is difficult for the vehicle-mounted device 111 and the base station 120 to perform effective communication. The threshold C1 may be a preset value.

When the Uu interface of the vehicle-mounted device 111 is unavailable or the signal quality of the Uu interface is lower than the threshold C1, the vehicle-mounted device 111 may exchange information with the roadside unit 140 through the PC5 interface, so that the roadside unit 140, in place of the vehicle-mounted device 111, applies for the identity certificate B11 from the certificate authority 130.

Still with reference to FIG. 3A, when the Uu interface of the vehicle-mounted device 111 is unavailable or the signal quality of the Uu interface is lower than the threshold C1, the vehicle-mounted device 111 may perform step 305 to send a certificate proxy application message to the roadside unit 140, where the certificate proxy application message includes certificate application information.

In some embodiments, before performing step 305, the vehicle-mounted device 111 may perform a communication handshake with the roadside unit 140. Specifically, as shown in FIG. 3A, the vehicle-mounted device 111 may perform step 303 to send a connection setup request to the roadside unit 140. The roadside unit 140 may send a connection setup response to the vehicle-mounted device 111 in response to the connection setup request. Therefore, a connection between the vehicle-mounted device 111 and the roadside unit 140 may be established, to facilitate subsequent information exchange between the vehicle-mounted device 111 and the roadside unit 140.

Still with reference to FIG. 3A, after receiving the certificate proxy application message, the roadside unit 140 may respond to the certificate proxy application message, extract the certificate application information from the certificate proxy application message, and send the certificate application information to the certificate authority 130 in step 306.

When receiving the certificate application information, the certificate authority 130 may generate the identity certificate B11 based on the certificate application information, and then may send the identity certificate B11 to the roadside unit 140 in step 307.

When receiving the identity certificate B11, the roadside unit 140 may add the identity certificate B11 to a certificate proxy application response, and send the certificate proxy application response to the vehicle-mounted device 111 in step 308.

The vehicle-mounted device 111 receives the certificate proxy application response, and may extract the identity certificate B11 from the certificate proxy application response. Therefore, the identity certificate B11 may be obtained, so that the vehicle-mounted device can obtain the identity certificate B11 through application through the PC5 interface when the Uu interface is unavailable or the signal quality of the Uu interface is poor.

Then a process of information exchange between the vehicle-mounted device 111 and the roadside unit 140 is specifically described in different embodiments.

Figure 3B:
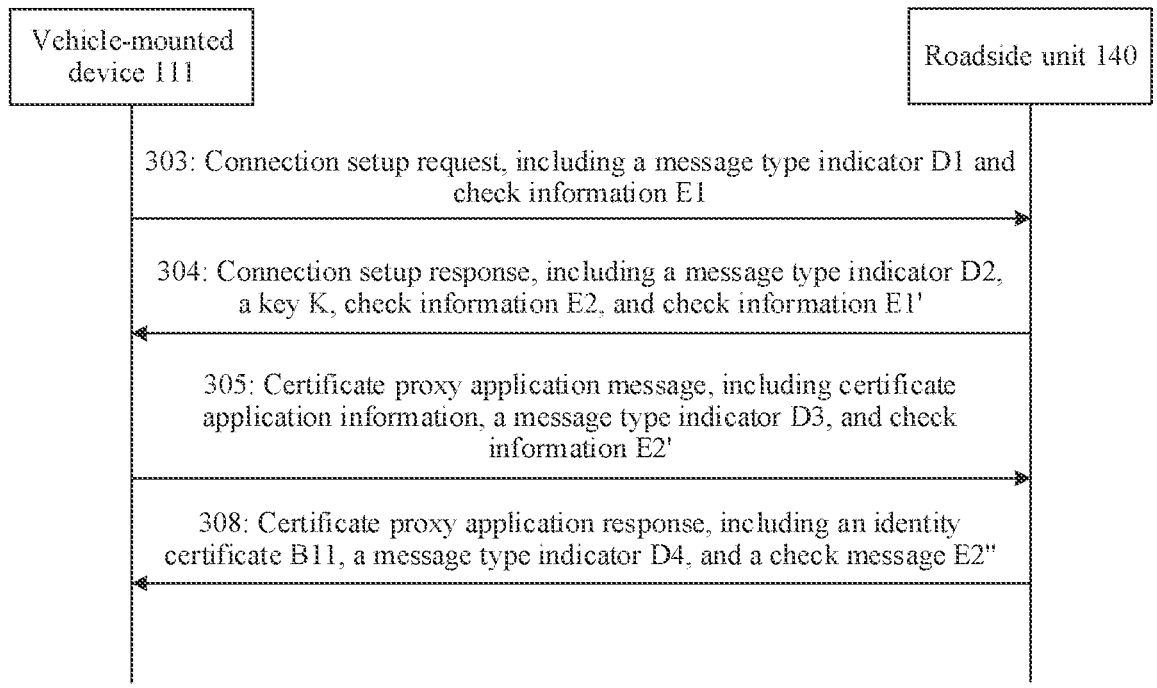
FIG. 3B is a flowchart of information exchange between a vehicle-mounted device and a roadside unit according to an embodiment of the present disclosure.

In some embodiments, with reference to FIG. 3B, the connection setup request sent in step 303 may include a message type indicator D1. The message type indicator D1 may be a preset character string or bit string, and is used to indicate that a message carrying the message type indicator D1 is a connection setup request, so as to indicate the roadside unit 140 to perform an operation based on the message, for example, send the connection setup request to the vehicle-mounted device 111. Usually, after the roadside unit receives a message sent by the vehicle-mounted device, if the message has no related indicator, the roadside unit may directly forward the message to another device, without further processing the message. Therefore, in this embodiment, the vehicle-mounted device 111 adds the message type indicator D1 to the connection setup request, to indicate the roadside unit 140 to further parse and respond to the connection setup request instead of directly forwarding the connection setup request to another device.

Still with reference to FIG. 3B, the connection setup request sent by the vehicle-mounted device 111 in step 303 may further include check information E1. For example, the check information may be a random number, for example, may be a random number generated by a rand(1) function. The check information E1 may be encrypted by using a public key of the roadside unit 140, so that the roadside unit 140 can decrypt the check information E1, and therefore may generate check information E1' corresponding to the check information E1. Details are described below, and details are not described herein.

For example, the connection setup request may be signed by using a registration certificate of the vehicle 110 (to be specific, the connection setup request is signed by using a private key corresponding to a public key F1 in the registration certificate), and the registration certificate, together with the connection setup request, is sent to the roadside unit 140. The roadside unit 140 may obtain the public key F1 from the registration certificate by using a public key of the certificate authority. Then whether the connection setup request is sent by the vehicle-mounted device 111 may be verified by using the public key F1.

The registration certificate of the vehicle may be identification information applied for from an internet of vehicles when the vehicle is registered with the internet of vehicles for the first time, and is a unique identity of the vehicle 110 in the internet of vehicles. The registration certificate of the vehicle is equivalent to a passport of the vehicle, has a validity period, and can be revoked.

For example, the connection setup request may be a BSM. To be specific, related information such as the message type indicator D1 and the check information E1 may be encapsulated into fields in the basic safety message.

It should be noted that a format of the connection setup request is not limited in this embodiment of the present disclosure. In another embodiment, the connection setup request may have another message type, for example, a message type that appears in the future.

Still with reference to FIG. 3B, the connection setup response sent by the roadside unit 140 in step 304 may include a message type indicator D2. The message type indicator D2 may be a preset character string or bit string, and is used to indicate that a message carrying the message type indicator D2 is a certificate application—related message, so as to indicate the vehicle-mounted device 111 to perform an operation based on the message, for example, send the certificate proxy application message to the roadside unit 140.

The connection setup response may further include a key K. The key K may be generated by the roadside unit 140, and is carried in the connection setup response, so that after receiving the connection setup response, the vehicle-mounted device 111 may extract the key K, and perform communication between the vehicle-mounted device 111 and the roadside unit 140 by using the key K. In an example, the roadside unit 140 may encrypt the key K by using the public key of the vehicle 110, and the public key may be the foregoing public key F1.

For example, the connection setup response may further include the check information E1'. The check information E1' is information that corresponds to the check information E1 and that is generated by the roadside unit 140 based on the check information E1. When the connection setup response includes the check information E1', the connection setup response is truly sent by the roadside unit 140 and is sent in response to the connection setup request in step 303.

Specifically, as described above, the connection setup request sent by the vehicle-mounted device 111 to the roadside unit 140 in step 303 may include the check information E1, and the check information is encrypted by using the public key of the roadside unit 140. The roadside unit 140 may decrypt the check information E1 by using a private key of the roadside unit 140, and then may obtain content of the check information E1, and accordingly generate the check information E1' corresponding to the check information E1. For example, devices (for example, the vehicle-mounted device 111, the roadside unit 140, and other vehicle-mounted devices or roadside units) in the internet of vehicles may agree upon a response rule for check information. When obtaining check information, a device may generate, according to the response rule, check information' corresponding to the check information. For example, the check information is a random number, and the following may be agreed upon: the check information is added to n (n may be a natural number) to obtain the check information'. The roadside unit 140 may generate, according to the response rule, the check information E1' corresponding to the check information E1. It can be understood that, because the check information E1 is encrypted by using the public key of the roadside unit 140, only the roadside unit 140 (to be specific, a device with the private key of the roadside unit 140) can decrypt the check information E1, and may generate the check information E1' corresponding to the check information E1. However, other devices do not have the private key of the roadside unit 140, and therefore cannot decrypt the check information E1, and therefore cannot generate check information E1', in other words, cannot generate correct check information E1'. Therefore, when receiving the connection setup response, the vehicle-mounted device 111 may determine, based on whether the connection setup response includes the check information E1' (in other words, correct check information E1'), whether the connection setup response is a message sent by the roadside unit 140, and whether the connection setup response is a message sent in response to the connection setup request in step 303. In an example, the roadside unit 140 may encrypt the check information E1' by using the public key of the vehicle 110, and the public key may be the foregoing public key F1.

For example, the connection setup response may further include check information E2. For example, the check information may be a random number, for example, may be a random number generated by a rand(2) function. The check information E2 may be encrypted by using the public key of the vehicle 110 (for example, the public key F1), so that the vehicle-mounted device 111 can decrypt the check information E2, and therefore may generate check information E2' corresponding to the check information E2. Details are described below, and details are not described herein.

For example, the roadside unit 140 may sign the connection setup response by using an application certificate of the roadside unit 140 (to be specific, sign the connection setup response by using a private key corresponding to a public key in the application certificate), and send the application certificate together with the connection setup response to the vehicle-mounted device 111. The vehicle-mounted device 111 may obtain the public key of the application certificate from the application certificate by using the public key of the certificate authority. Then whether the connection setup response is sent by the roadside unit 140 may be verified by using the public key.

For example, the connection setup response may be a BSM. To be specific, related information such as the message type indicator D2, the check information E2, and the check information E1' may be encapsulated into fields in the basic safety message.

For example, the connection setup response may be a RSM. To be specific, related information such as the message type indicator D1, the check information E2, and the check information E1' may be encapsulated into fields in the road safety message.

It should be noted that a format of the connection setup response is not limited in this embodiment of the present disclosure. In another embodiment, the connection setup response may have another message type, for example, a message type that appears in the future.

In step 303 and step 304, a security connection is established between the vehicle-mounted device 111 and the roadside unit 140, and the key K is exchanged. Then step 305 and subsequent steps may be performed.

Still with reference to FIG. 3B, in response to the connection setup response received in step 304, the vehicle-mounted device 111 may perform step 305 to send the certificate proxy application message to the roadside unit 140. The certificate proxy application message may include the certificate application information. Content and functions of the certificate application information are described below, and details are not described herein.

For example, when the connection setup response received in step 304 includes the check information E1', the vehicle-mounted device 111 may perform step 305. As described above, when the connection setup response includes the check information E1' (in other words, correct check information E1'), the connection setup response is truly sent by the roadside unit 140 and is sent in response to the connection setup request in step 303. The connection setup response may trigger, only in this case, the vehicle-mounted device 111 to send the certificate proxy application message, so as to avoid an unauthorized attack (for example, a replay attack) that triggers the vehicle-mounted device 111 to frequently send certificate proxy application messages.

For example, the vehicle-mounted device 111 may sign the certificate application information by using the registration certificate of the vehicle 110. The certificate proxy application message may include the registration certificate of the vehicle 110.

For example, the vehicle-mounted device 111 may encrypt the certificate application information by using the key K.

For example, the certificate proxy application message may further include a message type indicator D3. The message type indicator D3 may be a preset character string or bit string, and is used to indicate that a message carrying the message type indicator D3 is a certificate proxy application message, so as to indicate the roadside unit 140 to perform an operation based on the message, for example, forward the certificate application information to the certificate authority 130.

For example, the certificate proxy application message may further include check information E2'. The check information E2' is information that corresponds to the check information E2 and that is generated by the vehicle-mounted device 111 based on the check information E2. When the certificate proxy application message includes the check information E2', the certificate proxy application message is truly sent by the vehicle-mounted device 111 and is sent in response to the connection setup response in step 304. For details, refer to the foregoing descriptions of the check information E1'. Details are not described herein again. In an example, the check information E2' may be encrypted by using the key K.

For example, the certificate proxy application message may be signed by using the registration certificate of the vehicle 110, and the registration certificate, together with the certificate proxy application message, is sent to the roadside unit 140, so that the roadside unit 140 verifies whether the certificate proxy application message is sent by the vehicle-mounted device 111.

For example, the certificate proxy application message may be a BSM. To be specific, related information such as the certificate application information, the message type indicator D3, and the check information E2' may be encapsulated into fields in the basic safety message.

It should be noted that a format of the certificate proxy application message is not limited in this embodiment of the present disclosure. In another embodiment, the certificate proxy application message may have another message type, for example, a message type that appears in the future.

After receiving the certificate proxy application message, the roadside unit 140 may extract the certificate application information from the certificate proxy application message, and send the certificate application information to the certificate authority 130. The certificate authority 130 may generate the identity certificate B11 based on the certificate application information. The certificate authority 130 may send the identity certificate B11 to the roadside unit 140. The certificate application information and a process of generating the identity certificate B11 by the certificate authority 130 based on the certificate application information are specifically described below, and details are not described herein.

After receiving the identity certificate B11 from the certificate authority 130, the roadside unit 140 may perform step 308 to send the certificate proxy application response to the vehicle-mounted device 111. The certificate proxy application response includes the identity certificate B11. In an example, the identity certificate B11 may be encrypted by using the key K.

For example, the certificate proxy application response may further include a message type indicator D4. The message type indicator D4 may be a preset character string or bit string, and is used to indicate that a message carrying the message type indicator D4 is a certificate application-related message, so as to indicate the vehicle-mounted device 111 to perform an operation based on the message, for example, extract the identity certificate B11 from the certificate proxy application response.

For example, the certificate proxy application response may further include check information E2". The check information E2" is information that corresponds to the check information E2' and that is generated by the roadside unit 140 based on the check information E2', and is used to indicate that the certificate proxy application response is truly sent by the roadside unit 140, and is sent after the certificate proxy application message in step 305 is received. Therefore, this further indicates that the identity certificate B11 is a certificate that the roadside unit 140 applies for from the certificate authority based on the certificate proxy application message in step 305, to further ensure reliability of a source of the identity certificate B11. In an example, the check information E2" may be encrypted by using the key K.

Therefore, the vehicle-mounted device 111 may obtain the identity certificate B11.

Figure 3C:
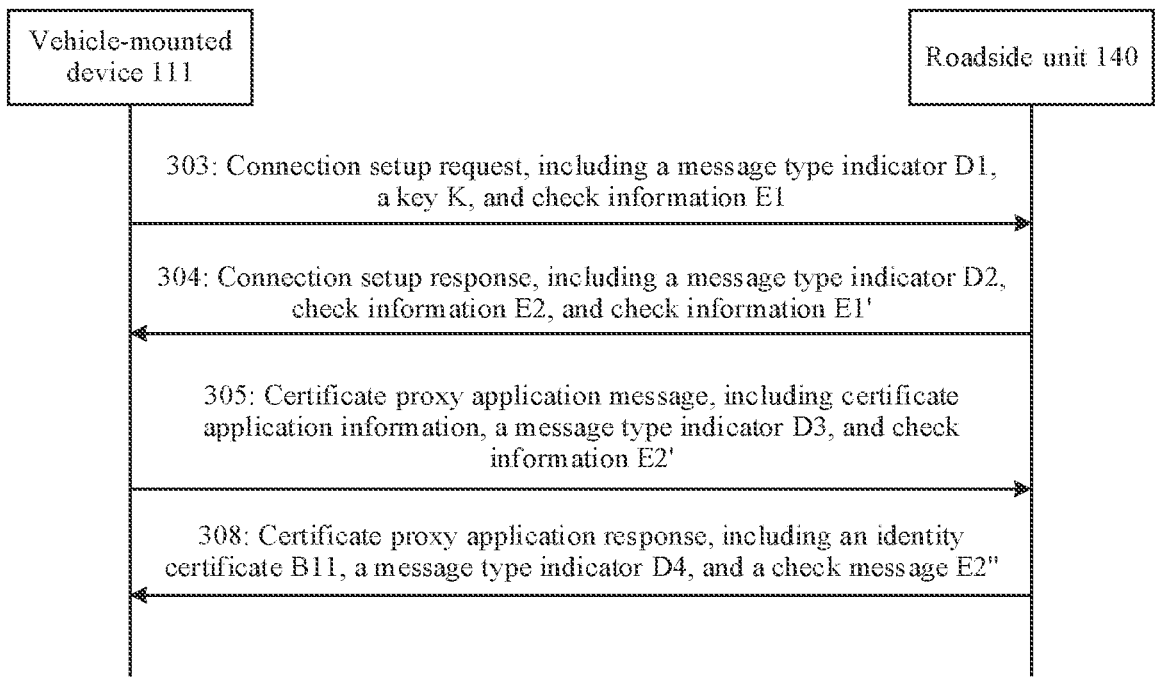
FIG. 3C is a flowchart of information exchange between a vehicle-mounted device and a roadside unit according to an embodiment of the present disclosure.

In some embodiments, with reference to FIG. 3C, the vehicle-mounted device 111 may perform step 303 to send the connection setup request to the roadside unit 140, where the connection setup request includes the key K. That is, in the embodiment shown in FIG. 3C, the key K may be generated by the vehicle-mounted device 111, and sent to the roadside unit 140 in step 303.

The connection setup request may further include a message type indicator D1 and check information E1. For the message type indicator D1 and the check information E1, refer to the foregoing descriptions of the embodiment shown in FIG. 3B. Details are not described herein again.

For a message format of the connection setup request in the embodiment shown in FIG. 3C, refer to the foregoing descriptions of the embodiment shown in FIG. 3B. Details are not described herein again.

As shown in FIG. 3C, the roadside unit 140 may perform step 304 to send a connection setup response to the vehicle-mounted device 111. The connection setup response may not include the key K, but may include a message type indicator D2, check information E2, and check information E1'. For details about the message type indicator D2, the check information E2, and the check information E1', refer to the foregoing descriptions of the embodiment shown in FIG. 3B. Details are not described herein again.

For a message format of the connection setup response in the embodiment shown in FIG. 3C, refer to the foregoing descriptions of the embodiment shown in FIG. 3B. Details are not described herein again.

For step 305 and step 308 in the embodiment shown in FIG. 3C, refer to the foregoing descriptions of the embodiment shown in FIG. 3B. Details are not described herein again.

Therefore, the vehicle-mounted device 111 may obtain the identity certificate B11.

Figure 3D:
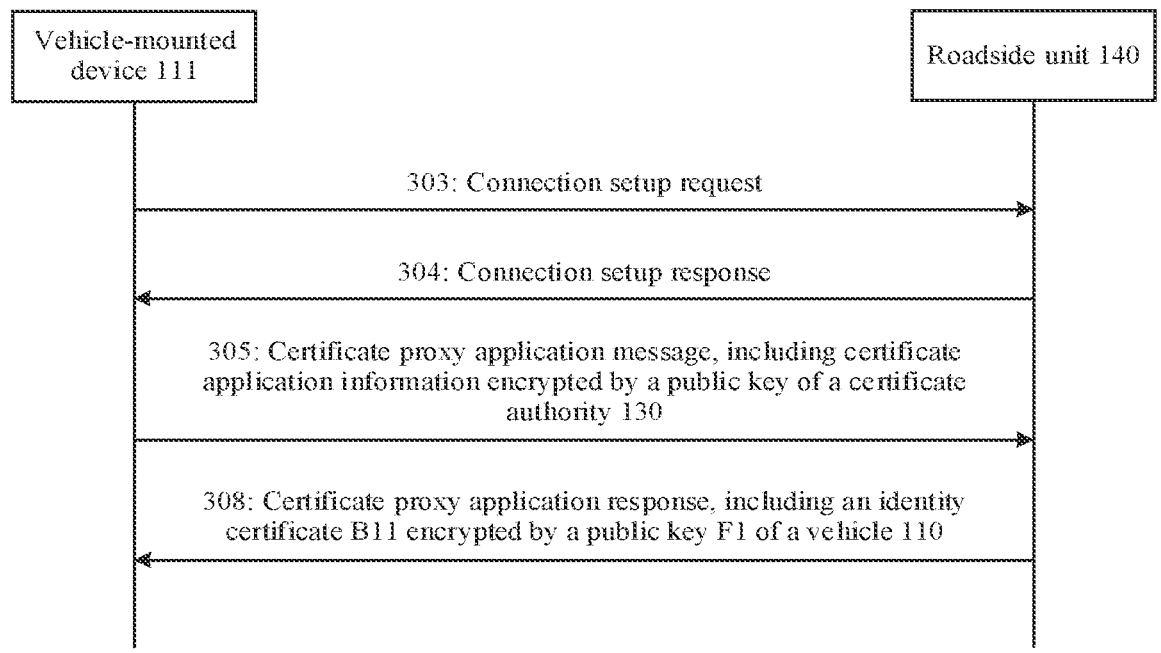
FIG. 3D is a flowchart of information exchange between a vehicle-mounted device and a roadside unit according to an embodiment of the present disclosure.

In some embodiments, with reference to FIG. 3D, the vehicle-mounted device 111 may perform step 303, and the roadside unit 140 may perform step 304. For details, refer to the foregoing descriptions of the embodiment shown in FIG. 3B or FIG. 3C. Details are not described herein again.

Still with reference to FIG. 3D, the vehicle-mounted device 111 may perform step 305 to send a certificate proxy application message to the roadside unit 140. Certificate application information in the certificate proxy application message is encrypted by using the public key of the certificate authority 130. Therefore, content of the certificate application information can be prevented from being disclosed to the roadside unit.

Still with reference to FIG. 3D, the roadside unit 140 may perform step 308 to send a certificate proxy application response to the vehicle-mounted device 111. An identity certificate B11 in the certificate proxy application message is encrypted by using the public key F1 of the vehicle-mounted device 111 (a public key in the registration certificate of the vehicle 110). Therefore, the identity certificate B11 can be prevented from being disclosed to the roadside unit 140.

Therefore, the vehicle-mounted device 111 may obtain the identity certificate B11.

Then a process of information exchange between the roadside unit 140 and the certificate authority 130 is described in different embodiments.

Figure 3E:
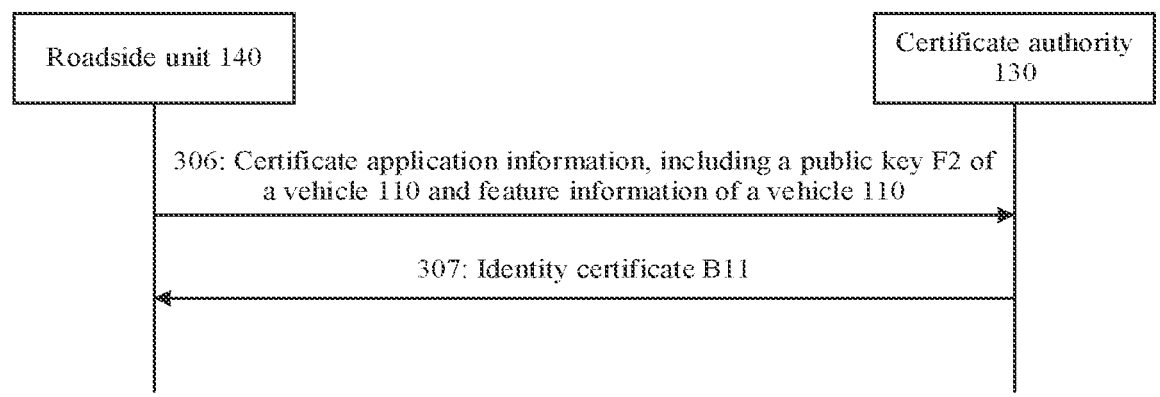
FIG. 3E is a flowchart of information exchange between a roadside unit and a certificate authority according to an embodiment of the present disclosure.
Figure 3F:
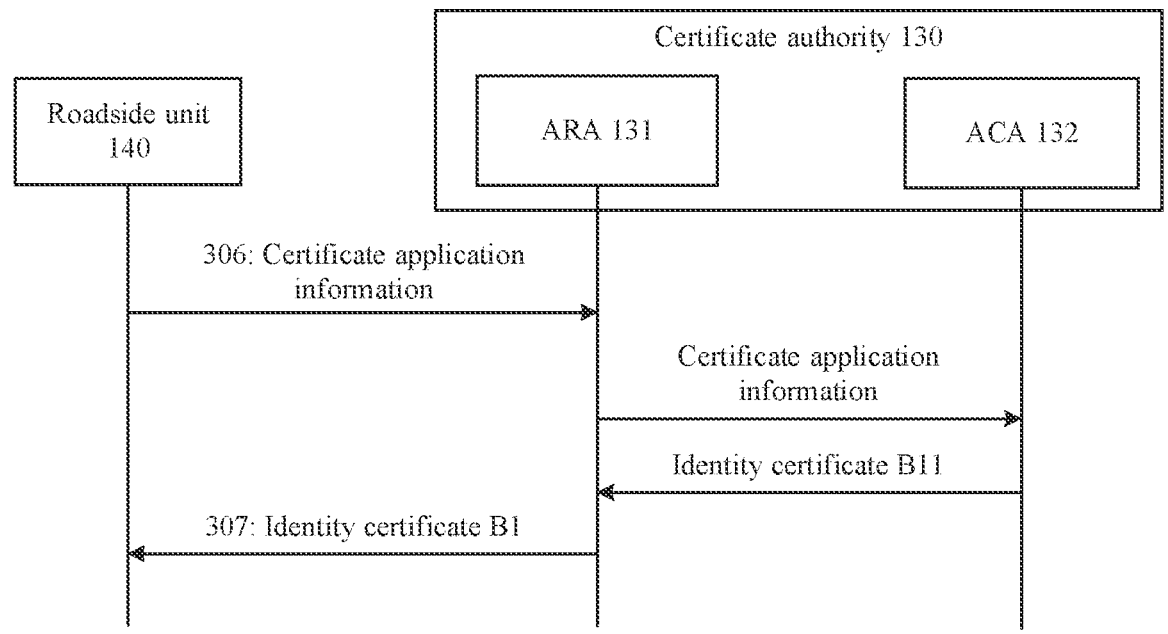
FIG. 3F is a flowchart of information exchange between a roadside unit and a certificate authority according to an embodiment of the present disclosure.

In some embodiments, with reference to FIG. 3E, the roadside unit 140 may extract the certificate application information from the certificate proxy application message, and perform step 306 to send the certificate application information to the certificate authority 130.

The certificate application information may include a public key F2 of the vehicle 110 and identity information of the vehicle 110. For example, the public key F2 and the public key F1 (the public key in the registration certificate of the vehicle 110) may be the same or different. For example, the identity information of the vehicle 110 may include vehicle information of the vehicle 110 or information about a user to whom the vehicle 110 belongs. It can be understood that, when a certificate applied for is a real-name certificate (an identity certificate corresponding to a real identity), the identity information of the vehicle 110 in the certificate application information may be real identity information of the vehicle 110. For example, the real identity information of the vehicle may include real vehicle information or real information about the user to whom the vehicle belongs.

For example, as described above, the certificate application information sent in step 305 may be information encrypted by using the public key of the certificate authority 130. After receiving the certificate application information, the certificate authority 130 may decrypt the certificate application information by using the private key of the certificate authority 130, to obtain a decrypted certificate application information.

For example, the certificate application information sent in step 305 may be information signed by using the registration certificate of the vehicle 110. The roadside unit 140 may further forward the registration certificate to the certificate authority 130. The registration certificate is received by the roadside unit 140 from the vehicle-mounted device 111. The certification authority 130 may verify whether the registration certificate is valid, for example, whether the registration certificate is in a validity period, or whether the registration certificate is revoked. If the registration certificate is valid, the certificate authority 130 may extract the public key F1 from the registration certificate, and decrypt the certificate application information.

The certificate authority 130 may sign the certificate application information by using the private key of the certificate authority 130, to obtain the identity certificate B11. Then the certificate authority 130 may perform step 307 to send the identity certificate B11 to the roadside unit 140. For example, the certificate authority 130 may first encrypt the identity certificate B11 by using the public key F1 of the vehicle 110, and then perform step 307 to send an encrypted identity certificate B11 to the roadside unit 140, so that the roadside unit 140 may forward the encrypted identity certificate B11 to the vehicle-mounted device 111. The vehicle-mounted device 111 may decrypt the identity certificate B11 by using a private key corresponding to the public key F1. Therefore, the vehicle-mounted device 111 may obtain the identity certificate B11.

In some embodiments, with reference to FIG. 3E, the certificate authority 130 may include an application registration authority (ARA) 131 and an application certificate authority (ACA) 132.

With reference to FIG. 3E, the roadside unit 140 may perform step 306 to send the certificate application information to the ARA 131. The ARA 131 may forward the certificate application information to the ACA 132. For example, when the certificate request information is information signed by using the registration certificate of the vehicle 110, the roadside unit 140 may forward the registration certificate to the ARA 131. The ARA 131 may verify whether the registration certificate is valid. If the registration certificate is valid, the ARA 131 forwards the certificate application information to the ACA 132.

The ACA 132 may generate the identity certificate B11 based on the certificate application information. For example, the certificate application information may be signed by using the private key of the ACA 132 to obtain the identity certificate B11.

The ACA 132 may send the identity certificate B11 to the ARA 131. When or after receiving the identity certificate B11, the ARA 131 may perform step 307 to send the identity certificate B11 to the roadside unit 140. Therefore, the roadside unit 140 may forward the identity certificate B11 to the vehicle-mounted device 111.

To sum up, in the vehicle certificate application method provided in embodiments of the present disclosure, when a Uu interface of a vehicle-mounted device is unavailable or signal quality of the Uu interface is poor, an identity certificate may be applied for through a PC5 interface, so that a required certificate can be obtained through application when a vehicle is in an environment in which signal quality of a Uu interface is poor, for example, in a tunnel or an underground garage.

Figure 4:
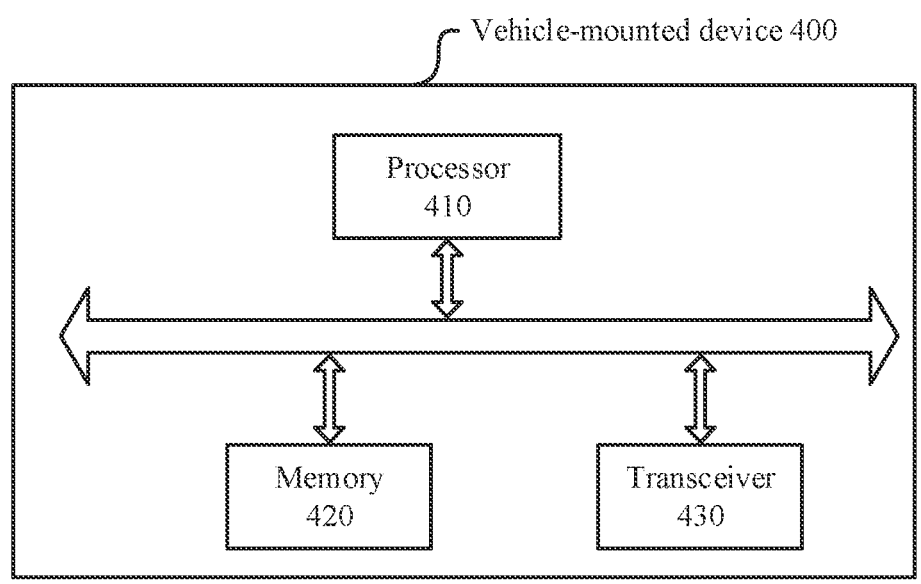
FIG. 4 is a schematic diagram of a structure of a vehicle-mounted device according to an embodiment of the present disclosure.

With reference to FIG. 4, an embodiment of the present disclosure provides a vehicle-mounted device 400. The vehicle-mounted device 400 may include a processor 410, a memory 420, and a transceiver 430. The memory 420 stores instructions, and the instructions may be executed by the processor 410. When the instructions are executed by the processor 410, the vehicle-mounted device 400 may perform the operations performed by the vehicle-mounted device 111 in the foregoing method embodiments, for example, the operations performed by the vehicle-mounted device 111 in FIG. 3A to FIG. 3D. Specifically, the processor 410 may perform a data processing operation, and the transceiver 430 may perform a data sending operation and/or a data receiving operation.

Therefore, when a Uu interface of a vehicle-mounted device is unavailable or signal quality of the Uu interface is poor, an identity certificate may be applied for through a PC5 interface, so that a required certificate can be obtained through application when a vehicle is in an environment in which signal quality of a Uu interface is poor, for example, in a tunnel or an underground garage.

Figure 5:
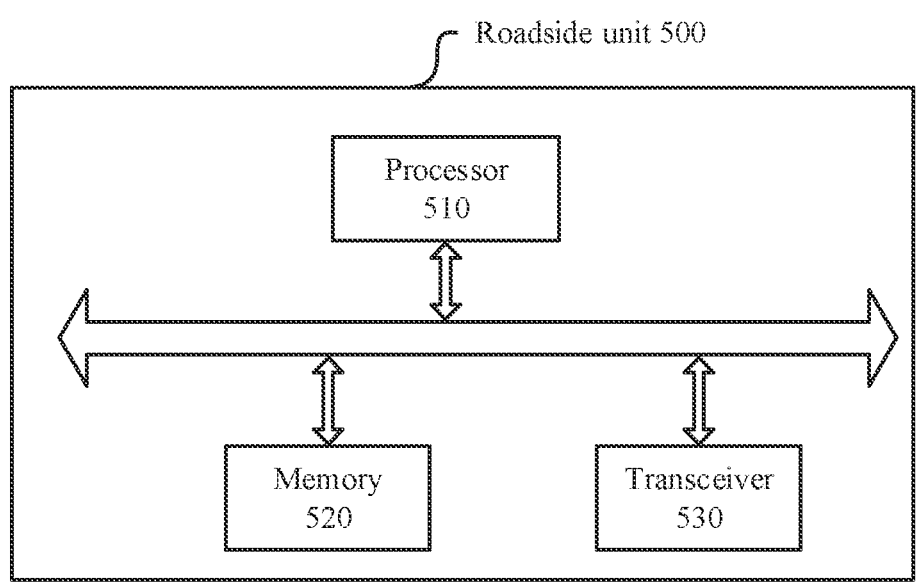
FIG. 5 is a schematic diagram of a structure of a roadside unit according to an embodiment of the present disclosure.

With reference to FIG. 5, an embodiment of the present disclosure provides a roadside unit 500. The roadside unit 500 may include a processor 510, a memory 520, and a transceiver 530. The memory 520 stores instructions, and the instructions may be executed by the processor 510. When the instructions are executed by the processor 510, the roadside unit 500 may perform the operations performed by the roadside unit 140 in the foregoing method embodiments, for example, the operations performed by the roadside unit 140 in FIG. 3A to FIG. 3F. Specifically, the processor 510 may perform a data processing operation, and the transceiver 530 may perform a data sending operation and/or a data receiving operation.

Therefore, when a Uu interface of a vehicle-mounted device is unavailable or signal quality of the Uu interface is poor, an identity certificate may be applied for through a PC5 interface, so that a required certificate can be obtained through application when a vehicle is in an environment in which signal quality of a Uu interface is poor, for example, in a tunnel or an underground garage.

The method steps in embodiments of the present disclosure may be implemented in a hardware manner, or may be implemented in a manner of executing software instructions by the processor. The software instructions may include corresponding software modules. The software modules may be stored in a random-access memory (RAM), a flash memory, a read-only memory (ROM), a programmable ROM (PROM), an erasable PROM (EPROM), an electrically EPROM (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an application-specific integrated circuit (ASIC).

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

It may be understood that various numbers in embodiments of the present disclosure are merely used for differentiation for ease of description, and are not used to limit the scope of embodiments of the present disclosure.

What is claimed is:

1. A method implemented by a vehicle-mounted device, the method comprising:
    determining that a universal mobile telecommunications system (UMTS) air (Uu) interface of the vehicle-mounted device is unavailable or a signal quality of the Uu interface is lower than a threshold;
    sending, to a roadside unit (RSU) in response to determining that the Uu interface of the vehicle-mounted device is unavailable or the signal quality of the Uu interface is lower than the threshold, a certificate proxy application message comprising certificate application information of a vehicle in which the vehicle-mounted device is mounted; and
    receiving, from the RSU, a certificate proxy application response comprising an identity certificate of the vehicle that is based on the certificate application information.

2. The method of claim 1, wherein the certificate application information comprises identity information of the vehicle and a public key of the vehicle, wherein the identity certificate of the vehicle is based on the identity information and the public key, and wherein the method further comprises determining, prior to sending the certificate proxy application message, that the vehicle has entered a first usage scenario that requires a service to be obtained by the vehicle based on the identity certificate.

3. The method of claim 2, wherein determining that the vehicle has entered the first usage scenario is based on a user input or on an operating status of a first device on the vehicle.

4. The method of claim 1, wherein the certificate proxy application message further comprises a registration certificate of the vehicle, wherein the certificate application information is signed with the registration certificate, and wherein the registration certificate verifies the certificate application information.

5. The method of claim 1, wherein the certificate proxy application message further comprises a message type indicator for indicating that a message carrying the message type indicator is the certificate proxy application message.

6. The method of claim 1, further comprising:
    sending, to the RSU prior to sending the certificate proxy application message, a connection setup request comprising first check information encrypted with a public key of the RSU; and
    receiving a connection setup response from the RSU comprising a second check information based on the first check information,
    wherein sending the certificate proxy application message comprises sending the certificate proxy application message to the RSU in response to receiving the connection setup response.

7. The method of claim 1, wherein the certificate application information is encrypted with a first public key of a third-party authority, and/or wherein the identity certificate is encrypted with a second public key of the vehicle.

8. The method of claim 1, wherein the certificate proxy application message is a first basic safety message (BSM), and/or wherein the certificate proxy application response is a second BSM or a road safety message (RSM).

9. A method implemented by a roadside unit (RSU), the method comprising:
    receiving, from a vehicle-mounted device when a universal mobile telecommunications system (UMTS) air (Uu) interface of the vehicle-mounted device is unavailable or a signal quality of the Uu interface is lower than a threshold, a certificate proxy application message comprising certificate application information of a vehicle in which the vehicle-mounted device is mounted;
    sending, to a third-party authority, certificate application information for generating an identity certificate;
    receiving, from the third-party authority, the identity certificate; and
    sending, to the vehicle-mounted device, a certificate proxy application response comprising the identity certificate.

10. The method of claim 9, wherein the certificate proxy application message further comprises a registration certificate of the vehicle, wherein the certificate application information is signed with the registration certificate, and wherein the method further comprises sending, to the third-party authority, the registration certificate for verifying the certificate application information.

11. The method of claim 9, wherein the certificate proxy application message further comprises a message type indicator for indicating that a message carrying the message type indicator is the certificate proxy application message.

12. The method of claim 9, wherein prior to receiving the certificate proxy application message, the method further comprises:
    receiving, from the vehicle-mounted device, a connection setup request comprising first check information encrypted with a public key of the RSU; and
    sending, to the vehicle-mounted device in response to the connection setup request, a connection setup response for enabling sending of the certificate proxy application message, wherein the connection setup response comprises second check information based on the first check information.

13. The method of claim 9, wherein the certificate application information is encrypted with a public key of the third-party authority, and/or wherein the identity certificate is encrypted with a public key of the vehicle.

14. The method of claim 9, wherein the certificate application information comprises a public key of the vehicle and identity information of the vehicle, and wherein the identity certificate is based on an encryption of the public key of the vehicle and the identity information of the vehicle with a private key of a third-party authority.

15. A vehicle-mounted device comprising:
    a memory configured to store instructions; and
    a processor coupled to the memory and configured to execute the instructions to cause the vehicle-mounted device to:
        determine that a universal mobile telecommunications system (UMTS) air (Uu) interface of the vehicle-mounted device is unavailable or signal quality of the Uu interface is lower than a threshold;
        send, to a roadside unit (RSU) in response to determining that the Uu interface of the vehicle-mounted device is unavailable or the signal quality of the Uu interface is lower than the threshold, a certificate proxy application message comprising certificate application information of a vehicle in which the vehicle-mounted device is mounted; and receive, from the RSU, a certificate proxy application response comprising an identity certificate of the vehicle based on the certificate application information.

16. The vehicle-mounted device of claim 15, wherein the certificate application information comprises identity information of the vehicle and a public key of the vehicle, wherein the identity certificate of the vehicle is based on the identity information and the public key of the vehicle; and wherein the method further comprises determining, prior to sending the certificate proxy application message, that the vehicle enters a first usage scenario that requires a service to be obtained by the vehicle based on the identity certificate.

17. The vehicle-mounted device of claim 15, wherein determining that the vehicle enters the first usage scenario is based on a user input or on an operating status of a first device on the vehicle.

18. A roadside unit (RSU) comprising:
a memory configured to store instructions; and
a processor coupled to the memory and configured to execute the instructions to cause the RSU to:
receive, from a vehicle-mounted device when a universal mobile telecommunications system (UMTS) air (Uu) interface of the vehicle-mounted device is unavailable or signal quality of the Uu interface is lower than a threshold, a certificate proxy application message comprising certificate application information of a vehicle in which the vehicle-mounted device is mounted;
send, to a third-party authority, a certificate application information for generating an identity certificate;
receive, from the third-party authority, the identity certificate; and
send, to the vehicle-mounted device, a certificate proxy application response comprising the identity certificate.

19. The RSU of claim 18, wherein the certificate proxy application message further comprises a registration certificate of the vehicle, wherein the certificate application information is signed using the registration certificate; and wherein the method further comprises sending, to the third-party authority, the registration certificate for verifying the certificate application information.

20. The RSU of claim 18, wherein the certificate proxy application message further comprises a message type indicator for indicating that a message carrying the message type indicator is the certificate proxy application message.

\* \* \* \* \*